United States Patent

[11] 3,536,171

| [72] | Inventor | Eduard Bergles<br>Vaterdorfstrasse 42, Graz, Steiermark, Austria |
|---|---|---|
| [21] | Appl. No. | 812,533 |
| [22] | Filed | March 7, 1969<br>Continuation-in-part of Ser. No.<br>673,566, Oct. 9, 1967, aandoned. |
| [45] | Patented | Oct. 27, 1970 |
| [32] | Priority | Sept. 5, 1968; Oct. 7, 1966 |
| [33] | | Austria |
| [31] | | A 8,632/68; A 9,411/66 |

[54] MULTIPLE-SPEED GEAR HUB OF THE AXIALLY DISPLACEABLE SHIFTING WHEEL TYPE FOR BICYCLES, MOTORCYCLES OR THE LIKE
20 Claims, 11 Drawing Figs.

[52] U.S. Cl. ............................................... 192/6, 74/750
[51] Int. Cl. ............................................... F16d 67/00
[50] Field of Search ............................................... 192/6, 6A; 74/750(B)

[56] References Cited
UNITED STATES PATENTS

| 2,180,527 | 11/1939 | Jones | 192/6A |
| 2,895,576 | 7/1959 | Schwerdhofer | 192/6A |
| 2,988,186 | 6/1961 | Dotter | 192/6AX |
| 3,114,442 | 12/1963 | Schwerdhofer | 192/6A |
| 3,299,745 | 1/1967 | Toplis | 74/750B |
| 3,352,175 | 11/1967 | Bergles | 74/750B |

*Primary Examiner*—Benjamin W. Wyche, III
*Attorney*—Spencer and Kaye

ABSTRACT: A multiple-speed gear hub which is suitable for wheeled vehicles such as bicycles, motorcycles or the like and which may be provided, if desired, with a "back pedal" brake. The gear hub is of the type employing a planetary transmission having a sun gear, planet gears and an internally toothed ring gear. The torque is supplied to the planetary transmission by means of a drive member having an axial and preferably polygonal-shaped extension. The extension serves to rotate (transmit torque to) but permit the axial movement of a surrounding shifting wheel.

The shifting wheel is provided with a series of teeth around its external circumference which are engageable with the internal teeth of the ring gear of the planetary transmission. It is also provided with a plurality of bores arranged to receive extensions of the shafts on which the planet gears revolve. Thus, when the shifting wheel is shifted to one axial position, its external teeth transmit torque to the ring gear of the planetary transmission while, when it is shifted to another position, it will be coupled to the planet gear shafts.

Patented Oct. 27, 1970

INVENTOR.
Eduard Bergles
BY Spencer & Kaye
Attorneys

Patented Oct. 27, 1970

3,536,171

INVENTOR.
Eduard Bergles
BY Spencer & Kaye
Attorneys

Patented Oct. 27, 1970

INVENTOR.
Eduard Bergles

BY Spencer & Kaye
Attorneys

MULTIPLE-SPEED GEAR HUB OF THE AXIALLY DISPLACEABLE SHIFTING WHEEL TYPE FOR BICYCLES, MOTORCYCLES OR THE LIKE

CROSS-REFERENCE TO RELATED APPLICATION

This application is a continuation-in-part of my copending application Ser. No. 673,566 filed Oct. 9th, 1967, and now abandoned.

BACKGROUND OF THE INVENTION

The present invention relates to a multiple-speed gear hub for bicycles, motorcycles or the like of the type having a drive member, connected to be driven by a chain sprocket, for transmitting torque to a planetary gear transmission. If desired, the multiple speed gear hub may also be provided with a back pedal brake having a brake cone.

Various two-wheeled vehicle multiple-speed gear hubs are known in the art which operate with a planetary gear transmission and employ expanding friction clutches or ratchet idlers as torque transmitting elements. These prior art hubs are constructed either to have the entire planetary gear transmission movable axially back and forth on its sun gear, which forms a single piece member with the axle, to change gears or with all the elements of the planetary gear transmission axially immovable in a common plane. In the latter case, the shifting of gears is usually effected with the aid of a separate axially displaceable torque transmitting "drive member" which carries a follower situated in a suitable slot.

In addition to the expense of construction due to their complexity, these hub transmissions have the disadvantage of being relatively wide in the axial direction and, thus, causing particular constructional difficulties when a sufficiently rugged safety or back pedal brake is to be included adjacent to the transmission. These difficulties are especially acute in cases where multiple-speed gear hubs are to be used for bicycles, since these hubs can not exceed a certain standardized width.

SUMMARY OF THE INVENTION

An object of the present invention, therefore, is to provide a multiple-speed gear hub which has a simple and robust transmission that is narrow enough to leave sufficient space for a suitable back pedal brake.

This object, as well as other objects which will become apparent in the discussion that follows, is achieved, according to the present invention, by providing a planetary transmission multiple-speed gear hub of the type described above with a special drive member that has an axial and preferably polygonal-shaped extension serving as a form-locking sliding surface for a separate "shifting wheel". The shifting wheel, which is arranged to surround and engage the periphery of the extension for rotation thereby, is shiftable in the axial direction on the extension to effect the change of gears. According to the invention, the shifting wheel is provided with a series of teeth around its external circumference which are engageable with the internal teeth of the ring gear of the planetary transmission. It is also provided with a plurality of bores arranged to receive extensions of the planet gear shafts. Thus, when the shifting wheel is shifted to one axial position, its external teeth will transmit torque to the ring gear of the planetary transmission and when it is shifted to another position, it will be coupled with the planet gear shaft.

The shifting wheel is shifted in the axial direction by means of a "follower ring" arranged in an axial slot in the polygonal extension of the drive member. Although slotted drive members are known in the art, these drive members have no polygonal extension so that the "key" or shifting claw within the slot is required to transmit the entire torque. This prior art arrangement is therefore easily subject to breakdown. With the driver member according to the present invention the entire torque is transmitted by the polygonal extension with the follower ring serving only to shift the shifting wheel.

2

DESCRIPTION OF THE PREFERRED EMBODIMENTS

Figure 10:
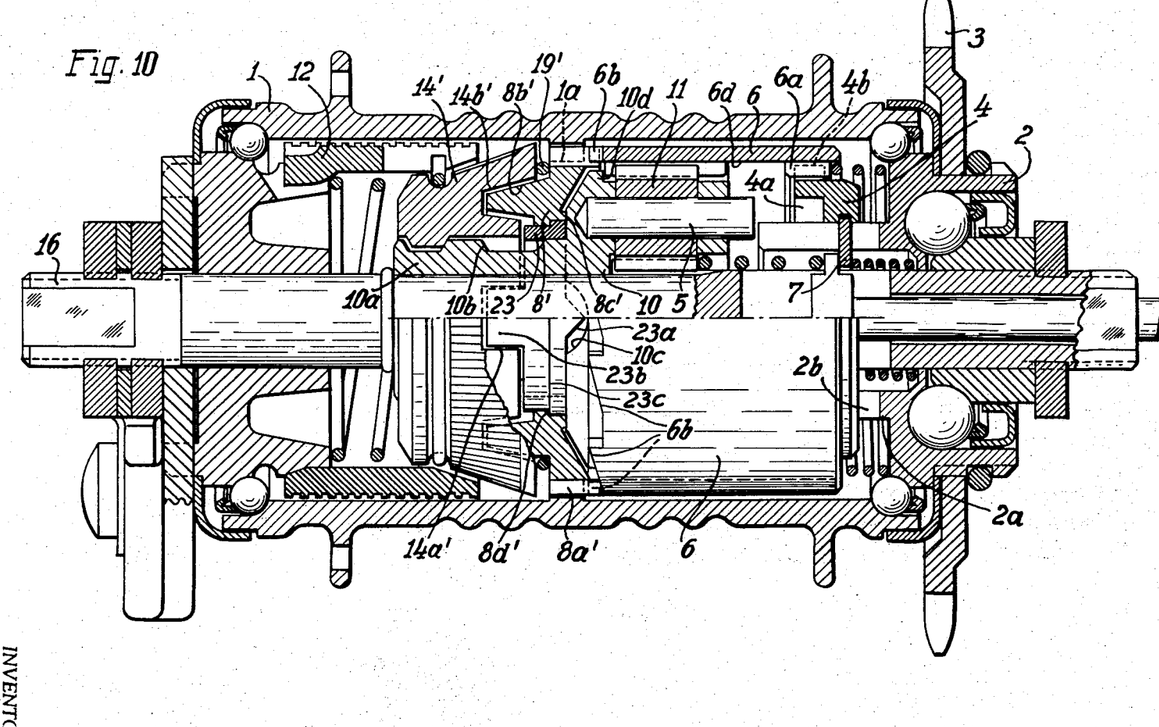
FIG. 10 is an enlarged axial sectional view of a multiple-speed gear hub according to a second preferred embodiment of the present invention.
Figure 11:
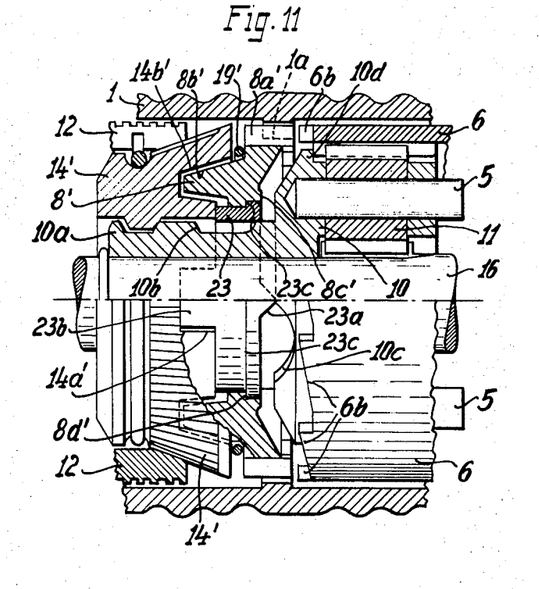
FIG. 11 is a fragmentary axial sectional view showing the multiple-speed gear hub embodiment of FIG. 10 with its detent ring and decoupling ring in different positions.

FIGS. 1—9 of the drawings illustrate the first preferred embodiment of the multiple-speed gear hub according to the present invention. FIGS. 10 and 11 illustrate a modified or second embodiment thereof. The gear hub of both embodiments can be constructed to meet the standard dimensions for bicycles.

Turning first to the embodiment illustrated in FIGS. 1—9, FIG. 1 shows a wheel hub 1 accommodating the drive member 2 according to the present invention. This drive member is driven on one side by a sprocket 3 and provided, on the other, with an extension 2a whose periphery has a polygonal cross section in the view of FIG. 2. In the present embodiment the polygonal section is four-sided. The extension 2a has at least one narrow axial slot 2b. A shifting wheel 4, having a matching polygonal (e.g., square) opening is supported by this extension 2a. On its frontal face the shifting wheel is provided with a plurality of holes 4a which correspond in number to, or to a multiple of, the number of planet gear shafts 5. At the outer periphery of the shifting wheel there is provided a series of gear teeth 4b which mesh with the teeth 6a of a ring gear 6. These teeth are constructed to allow suitable play in the peripheral direction.

Figures 2, 4:
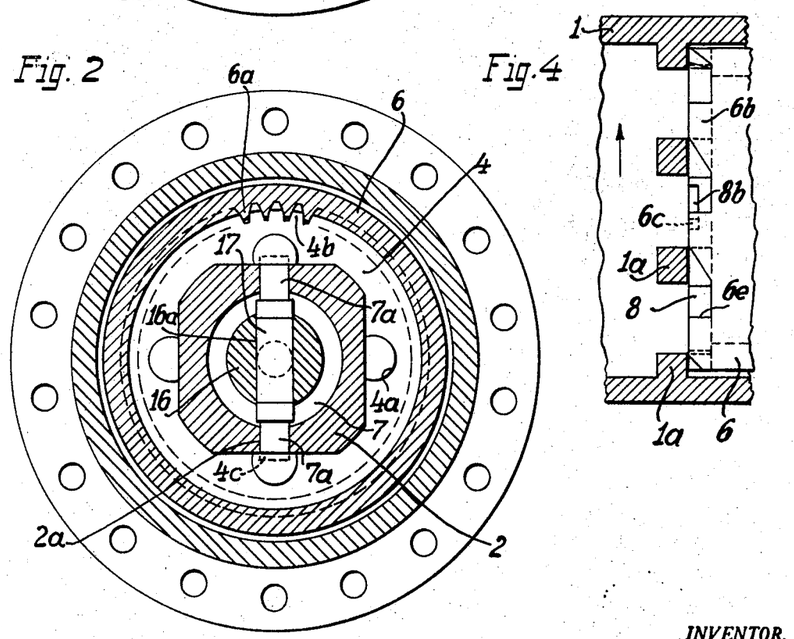
FIG. 2 is a transverse sectional view of the multiple-speed gear hub embodiment of FIG. 1 taken along the line II–II.
FIG. 4 is a fragmentary view showing the hub body jaws and associated portions of the internally toothed ring gear and the detent ring of the multiple-speed gear hub embodiment shown in FIG. 3. The ring gear and the detent ring are shown in the idle position.

As shown in FIG. 2, the internal flat (four) sides of the shifting wheel are provided with a groove 4c which receives lugs 7a of a follower ring 7. The follower ring consists of a narrow metal plate having lugs 7a at two mutually opposite sides. These lugs are guided in the longitudinal or axial slot 2b of the drive member 2.

Figure 3:
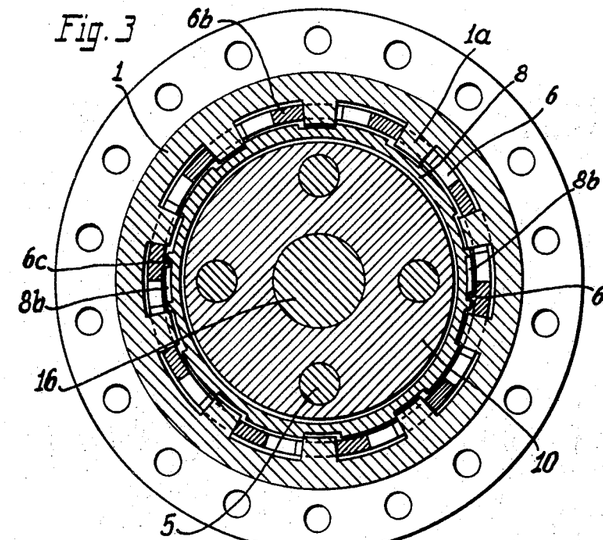
FIG. 3 is a transverse sectional view of the multiple-speed gear hub embodiment of FIG. 1 taken along the line III–III.

Referring again to FIG. 1, the internally toothed ring gear 6 there shown is tubular in shape and provided at its interior with a wide peripheral groove 6d that interrupts the tooth pattern and provides room for the shifting wheel 4 when the latter is out of engagement with the ring gear teeth 6a. A ring of teeth 6b is also provided at the left frontal face of the ring gear 6. As is shown in FIG. 3, these face teeth are engageable with the jaws 1a of the hub body 1. Two mutually opposite ones of the face teeth 6b are provided with small projections 6c (see also FIG. 5) which limit the peripheral movement of a detent ring 8 and prevent the latter from falling out. The right-hand face of the narrow internal ring of teeth 6a on the ring gear 6 is slightly upset to form an abutment for the shifting wheel 4 so that the ring gear 6 will be taken along when the wheel 4 is shifted toward the right.

Figure 1:
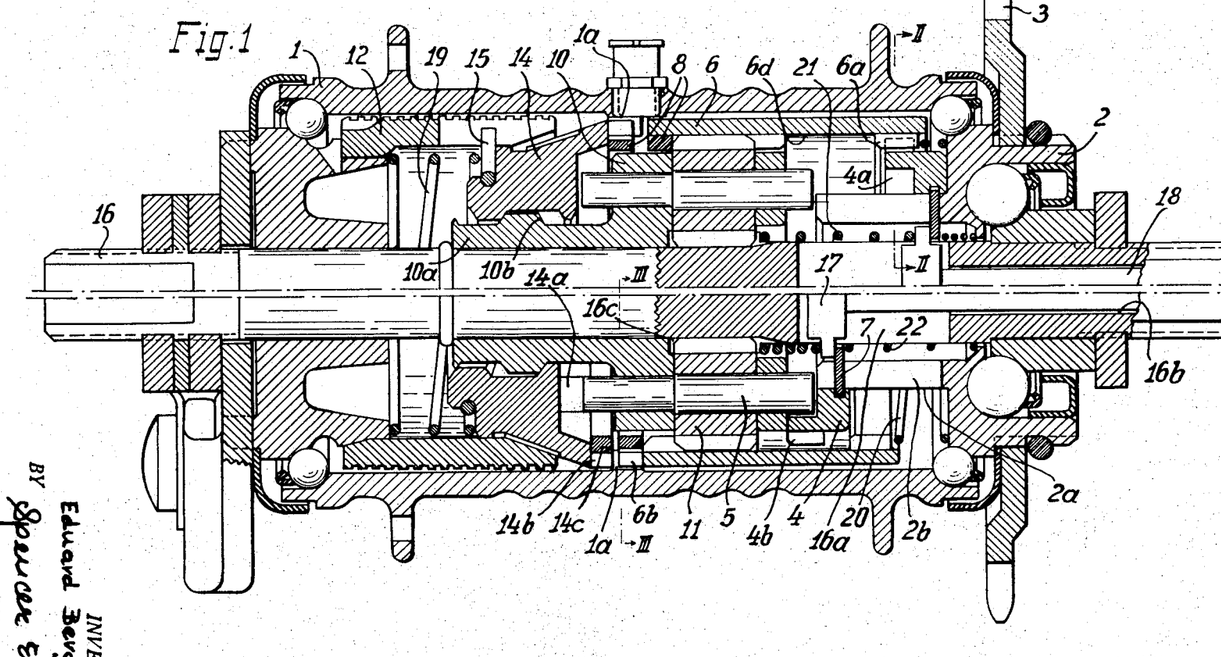
FIG. 1 is an enlarged axial sectional view of a multiple-speed gear hub according to a first preferred embodiment of the present invention showing the gear hub in a first gear position above its central axis and in a second gear position below.

A plurality of planet gears 11 are mounted on a planet gear carrier 10 by means of shafts 5 which extend through apertures in the carrier. The teeth of the planet gears 11 continually remain engaged with additional internal teeth of the axially slidable ring gear 6. These teeth are identical to the teeth 6a which mesh with the teeth 4b of the shifting wheel 4, but are situated to the left of the groove 6d.

The planet gear carrier 10 has a hub-shaped projection 10a which is provided on the outside with a trapezoidal-shaped coarse thread 10b. This coarse thread functions in the manner well known in the art to convert the torque applied by back pedaling into an axially directed force against the brake cone 14 and the brake sleeve 12. The brake cone 14 is provided on its right-hand end face with face teeth 14b which are similar in shape but oppositely directed to the face teeth 6b on the ring gear 6. Two mutually opposite ones of the face teeth 14b on the brake cone 14 exhibit small projections 14c which serve to retain a second detent ring 8 and to limit its movement.

The brake cone 14 is also provided with a second series of jaws or face teeth 14a on its right end face. These face teeth are arranged in alignment with the planet gears and allow the brake cone to be driven by the planet gear shafts 5. They also prevent the face side of the brake cone from coming in contact with the face side of the planet gear carrier 10 so that the axial movement permitted by the play at the coarse thread 10b makes it possible for the face teeth 14b to engage the jaws 1a of the hub body 1.

The brake members shown in FIG. 1 form a conventional well-known brake of the type having an expanding cone. In addition to the brake sleeve 12 and the brake cone 14 these brake members include a friction spring 15 and a compression spring 19. As is well known in the art, the friction spring 15 serves to prevent a rotation of the brake cone 14 when the braking operation is initiated. The compression spring 19 acts to bias the brake cone 14 in the direction of engagement with the jaws 1a of the hub body.

The detent rings 8 are provided on their outer periphery with suitable recesses 8a, which correspond in number to the jaws 1a of the hub body, and on their front faces with two mutually opposite face grooves 8b. These face grooves serve to receive the small projections 6c and 14c of the ring gear 6 and the brake cone 14, respectively. The detent rings 8 may alternatively each consist of a smooth ring having only two mutually opposite lugs 8c, per FIGS. 6—9, which engage the internally toothed ring gear or brake cone with a depth equal to the full height of the jaws 1a. In this case, two mutually opposite teeth of the internally toothed ring gear and of the brake cone must be almost completely removed.

The axle 16 of the multiple-speed gear hub, which carries a sun gear 16c, is provided with a slot 16a adjacent to the drive member 2, and with a bore 16b, which extends from the slot 16a to the right-hand end of the shaft. A key 17 is arranged in the slot 16a and is attached to a pin 18 inserted in the bore 16b. The key 17 and the pin 18 are slidable in the axial direction to effectuate the shifting of the gears.

The portion of FIG. 1 above the central axis illustrates the multiple-speed gear hub in the low-speed (uphill) gear position. In this case, force is transmitted from the drive member 2 to the shifting wheel 4 by means of the flat sides of the extension 2a. The shifting wheel 4 drives the ring gear 6, since the teeth 4b of the former are in mesh with the teeth 6a of the latter. From the ring gear 6, the force is transmitted through the planet gears 11 to the planet gear shafts 5. The protruding left-hand ends of the shafts 5 engage and drive the jaws 14a of the brake cone 14. Since, as noted above, the compression spring 19 holds the face teeth 14b of the brake cone 14 in engagement with the jaws 1a, the force will finally be delivered to the hub body 1.

Below the center line in FIG. 1, the multiple-speed gear hub is shown in the high-speed (downhill) gear position. In this position, the force is again transmitted via the drive member 2 to the shifting wheel 4. In this case, however, the bores 4a in the end face of the shifting wheel engage the planet gear shafts 5, so that the shifting wheel 4 drives the ring gear 6 via the planet gears 11. The face teeth 6b of the ring gear 6 are in mesh with the jaws 1a of the hub body 1 to drive the latter. A compression spring 20 holds this ring gear 6 in mesh with the hub body jaws 1a.

When the shifting wheel 4 is in its intermediate gear position (not shown), the internally toothed ring gear 6 assumes the same position as it does in the high-speed gear position of the multiple-speed gear hub, as shown in FIG. 1 below the center line. However, in this case, the external teeth 4b of the shifting wheel 4 are in mesh with the internal teeth 6a and the planet gear shafts 5 are disengaged from the bores 4a of the shifting wheel. The force is, therefore, transmitted from the drive member 2 through the shifting wheel 4 to the ring gear 6, and from there, via the face teeth 6b, to the jaws 1a of the hub body 1. The spring 20 holds the ring gear 6 in positive engagement with jaws 1a. This position of the multiple-speed gear hub provides a "direct drive". In this position, as well as in the high-speed gear position, the internally toothed ring gear 6 rotates at a higher speed than both the planet gear carrier 10 and the brake cone 14, which is coupled to the carrier. The face teeth 14b of the brake cone do not become effective in these two gear positions because the jaws 1a of the hub body continuously lead or move faster than the teeth 14b.

The follower ring 7, which is guided in the axial slot or groove 2b of the drive member 2, is axially guided under the influence of the different forces applied in opposite directions by the springs 21 and 22. So long as the gear hub is at a standstill or rotating but not subjected to torque, the force of the springs 21 and 22 will immediately effectuate a shift in the position of the follower ring 7 if the cooperating gears or jaws are properly aligned. When the multiple-speed gear hub is rotating under load or where the cooperating gears or jaws are out of alignment, (standing tooth against tooth) the springs 21 and 22 permit the desired speed position to be "preselected". In this way, the follower ring 7 can be spring-loaded by shifting the position of the pin 18 so that, when the torque is momentarily removed or the gears aligned, the stored spring force will immediately shift the follower ring.

The detent rings 8 of the multiple-speed gear hub according to the present invention are of special significance since they prevent the development of undesired noise when the face teeth 6b or 14b are disengaged from the hub body jaws 1a and they provide sufficient play in the forward direction so that the brake will not be allowed to lock. As both rings have the same mode of operation, only the detent ring which is disposed near the left-hand end of the internally toothed ring gear 6 will be described below.

Figure 5:
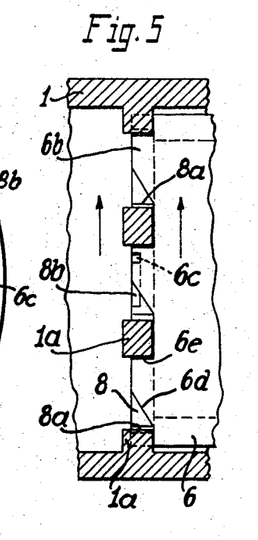
FIG. 5 is a fragmentary view showing the hub body jaws and associated portions of the internally toothed ring gear and the detent ring of the multiple-speed gear hub embodiment shown in FIG. 3. The ring gear and the detent ring are shown in engagement.

In the position shown in FIG. 5, the face teeth 6b of the ring gear 6 are in mesh with the jaws 1a of the hub body 1. The diameter of the circle formed by the inside tips of the jaws 1a is slightly smaller than the inside diameter of the face teeth of the ring gear 6, as is clearly apparent from FIG. 3. The detent ring 8 is provided around its entire periphery with grooves 8a which are somewhat wider than the jaws 1a of the hub body. The outside diameter of the ring 8 exceeds the diameter of the circle formed by the inner tips of the jaws 1a so that the detent ring 8 will be positively driven by the jaws 1a as long as the hub body 1 and the internally toothed ring gear 6 rotate at the same speed (are in engagement).

The detent ring 8 is also formed with face grooves 8b, which receive the radially extending projections 6c of the ring gear 6, so that the detent ring will be axially shifted with the ring gear 6. When the forward drive applied to the multiple-speed gear hub is discontinued so that the ring gear 6 no longer rotates, the inclined surfaces 6d will cause the face teeth 6b to slide past the edges of the jaws 1a of the hub body and force the ring gear 6 out of the jaws. As these jaws of the hub body engage the sides of the grooves 8a of the detent ring 8, the latter will follow the rotation of the hub body and rotate in unison therewith until further rotation of the detent ring is prevented by the small projections 6c and, finally, the detent ring is pulled out of engagement with the jaws 1a of the body by the disengagement of the ring gear 6.

When the detent ring 8 is disengaged from the hub body jaws 1a and the hub body rotates faster than the detent ring or the ring gear 6, the small force produced by the friction between the end faces of the hub body jaws and the detent ring holds the detent ring in the position described above; that is, with the projections 6c abutting the ends of the small face grooves 8b. Because of the play due to the length of the face grooves 8b, the detent ring 8 will in this position have rotated until its outer diameter surfaces have emerged from under the axial faces 6e of the face teeth 6b. Since the outside diameter of the detent ring 8 exceeds the inner diameter of the hub jaws 1a, the latter can not engage the face teeth 6b of the ring gear 6, thus ensuring silent operation.

When the drive of the ring gear 6 is resumed, the detent ring 8 will remain in this limiting position, preventing the hub jaws 1a from engaging the face teeth 6b, until the speed of the ring gear exceeds the speed of the hub body. Thereafter, the friction between the end faces of the hub body jaws 1a and the detent ring 8 cause the latter to be turned back to its initial position. This rotary movement of the detent ring 8 is assisted by the fact that the jaws 1a of the hub body are slightly narrower than the grooves 8a in the detent ring, allowing the two parts to slightly engage.

Figures 6, 8:
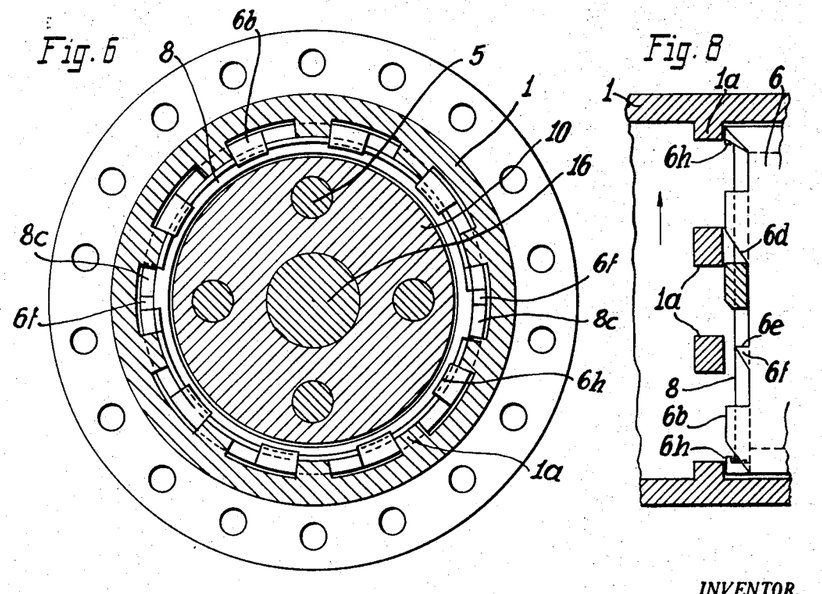
FIG. 6 is a transverse sectional view of a modification of the multiple-speed gear hub embodiment of FIG. 1 taken along the line III–III.
FIG. 8 is a fragmentary view, showing the hub body jaws and associated portions of the internally toothed ring gear and the detent ring of the multiple-speed gear hub arrangement shown in FIG. 6. The ring gear and the detent ring are shown in the idle or free-wheeling position.
Figures 7, 9:
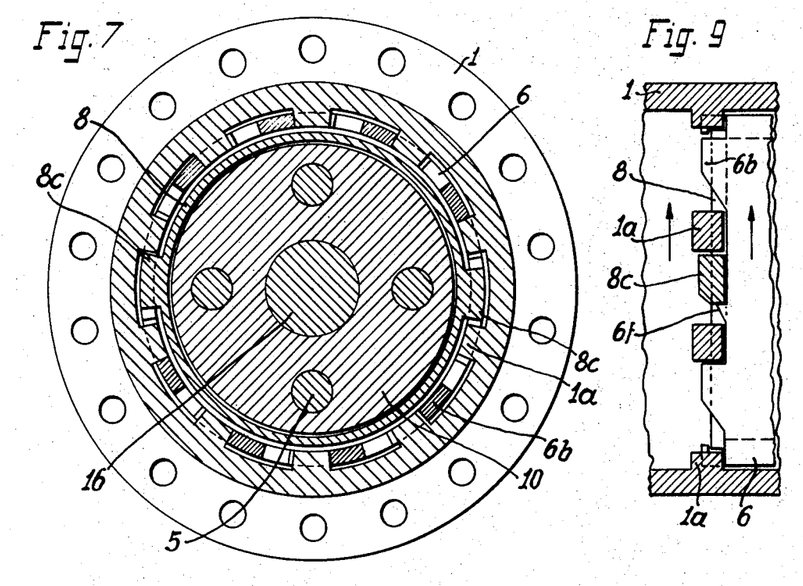
FIG. 7 is a transverse sectional view of the modification of the multiple-speed gear hub arrangement shown in FIG. 6 taken along the line III–III of FIG. 1.
FIG. 9 is a fragmentary view showing the hub body jaws and associated portions of the internally toothed ring gear and the detent ring of the multiple-speed gear hub arrangement shown in FIG. 7. The ring gear and the detent ring are shown in engagement.

Another embodiment of the detent ring 8 is shown in FIGS. 6—9. Like FIG. 3, FIGS. 6 and 7 are cross-sectional views of the multiple-speed gear hub of FIG. 1 taken along the line III—III. FIGS. 6 and 8 show the ring gear 6 and detent ring 8 out of engagement with the hub body jaws 1a while FIGS. 7 and 9 show these members in engagement. With the exception of the modifications which will be discussed below, the multiple-speed gear hub, both in construction and operation, remains identical to that hereinbefore described.

In this embodiment the diameter of the circle formed by the inner tips of the jaws 1a of the hub body must be as large or larger than the inside diameter of the face teeth 6b of the ring gear 6. Two mutually opposite face teeth must also be removed, except for a small portion 6f, to provide space for two protruding lugs 8c of the detent ring (see FIGS. 8 and 9). Angular movement of the detent ring 8 is limited by the axial faces 6e on one side and the inclined faces 6d on the other side of the face teeth 6b. Whereas projections 6c on two mutually opposite face teeth were provided in the embodiment described above, the face teeth 6b in this embodiment are provided with an internal peripheral groove so that each face tooth exhibits a small land 6h which prevents the detent ring 8 from falling out in the axial direction.

In the above-described embodiment the detent ring 8 was controlled only by the tips of the jaws 1a of the hub body. In the present case, the entire height of the lugs 8c is utilized to control the detent ring 8. Two lugs 8c are therefore sufficient. The manufacture of the multiple-speed gear hub is made easier if the two lugs 8c are bent at right angles toward the jaws 1a with their end faces slightly protruding over the end faces of the face teeth 6b.

The detent ring embodiment just described operates in a manner identical to that of the detent ring embodiment described above in connection with FIGS. 3—5. It should be noted that both of the detent rings 8 (i.e., the detent ring associated with the ring gear 6 and the detent ring associated with the brake cone 14) should be constructed according to the same embodiment.

The detent ring 8 associated with the face teeth 14b of the brake cone 14 has the same effect as the detent ring on the ring gear 6. Since all back pedal brake hubs are actuated by applying a control led backward pressure to the vehicle pedals and, in turn, the hub sprocket, it is clear that pushing the wheel backwards will cause rotation in the same direction as during braking. It is therefore possible, if the mechanism for idling grips or engages too quickly after the brakes have been sharply applied, that the brake will not be given time to release. If no steps are taken to prevent this occurrence, the brake will lock.

When the back pedal brake in the multiple-speed gear hub according to the present invention is applied, the two detent rings 8 will assume the free-wheeling or idling position described above. When the driving force is reapplied to the wheel hub, the respective detent ring must first be rotated in the forward direction. Since during this time there is no force applied to the brake, the brake will be allowed to completely release before engagement with the hub body jaws.

The planet gear shafts 5 protruding from the left-hand side of the planet gear carrier 10 as well as the coarse screw thread 10b on the extension 10a of the carrier 10 may be replaced by at least two sawtooth-shaped jaws on the carrier 10 which engage sawtooth-shaped complementary jaws 14a of the brake cone 14. This permits the internal coarse screw thread of the brake cone, which cooperates with the thread 10b, to be eliminated so that the brake cone 14 can be mounted directly on the axle 16.

In this case, the brake cone 14 will be driven by the straight or axially directed side faces of the sawtooth-shaped jaws on the planet gear carrier 10 rather than by the planet gear shafts. The inclined faces of the sawtooth-shaped jaws can be used to apply the axial pressure to the brake cone 14 to actuate the brake.

The axial play of the brake cone 14 which is necessary to permit disengagement of its sawtooth-shaped outer face teeth 14b from the jaws 1a of the hub body is inherent in this embodiment because, unlike a coarse screw thread, the two sawtooth-shaped inner jaws of the brake cone and of the planet gear carrier can exert axial forces in only one direction. In this embodiment the spring 19 is employed to return the brake cone after the brake has been applied. This spring is also required in the embodiment employing the coarse screw thread to allow engagement and disengagement of the sawtooth-shaped brake cone face teeth 14b and the jaws 1a of the hub body.

In order to simplify the components of the multiple-speed gear hub and to achieve a more compact construction of the gear assembly—this being of special importance for the relatively small gear hub used in bicycles, since these are subjected to great stresses—a still further embodiment of the multiple-speed gear hub according to the present invention provides for a single detent ring designed to form a clutch between the jaws of the hub body 1 and the sawtooth-shaped face teeth of the ring gear 6.

More particularly, the multiple-speed gear hub of the type described above in connection with FIGS. 1 and 2 is provided with an axially displaceable detent ring having teeth which can mesh with the face teeth 6b of the ring gear 6. This toothed detent ring is also always in engagement with the jaws 1a of the hub body. It is provided with an external cone for coupling with an internal cone of the brake cone and is disposed on a decoupling ring which is located on the planet gear carrier between this carrier and the brake cone.

The decoupling ring is provided at one of its frontal sides with two or more control tongues which are disposed in recesses in the planet gear carrier. These recesses exhibit control or cam surfaces which engage the control tongues. The other frontal side of the decoupling ring is provided with jaws that engage in grooved recesses in the brake cone.

Both the decoupling ring and the detent ring are provided with annular, radially extending shoulders. These shoulders lie axially opposite each other so that, when they abut they will cause the decoupling ring and detent ring to move together in the axial direction. Finally, an annular spring is provided between the detent ring and the brake cone to spread them apart in the axial direction.

This embodiment of the multiple-speed gear hub according to the present invention provides for a more compact and robust construction of the hub and effects a completely noiseless and almost frictionless operation when the hub is freewheeling. This embodiment exhibits the further advantage of making it possible to brake in all three gears by the backpedalling even when the vehicle is rolling backwards.

This final embodiment of the present invention is illustrated in FIGS. 10 and 11. The elements in FIG. 10 which are identical in construction and operation to corresponding elements shown in FIG. 1 are designated with the same reference numerals.

According to this embodiment of the present invention, the teeth 6b of the ring gear 6 are engageable with a ring of teeth 8a' of an axially movable detent ring 8'. The ring of teeth 8a' are permanently engaged with the radially disposed jaws 1a of the hub body 1.

On the side opposite the teeth 8a' the detent ring 8' exhibits an external cone 8b' which cooperates with an inner cone surface 14b' of the brake cone 14'. With the narrow ring surface 8c' serving as an abutment these cone surfaces can be pressed together to couple the detent ring 8' to the brake cone 14'. Because of the coarse thread 10b of the planet gear carrier 10 disposed on the wheel axle 16, the planet gear carrier 10 can thus be selectively connected with the hub body 1.

The detent ring 8' is continuously pressed in the direction of the ring gear by means of the annular spring 19'.

The detent ring 8' is rotatably mounted on a decoupling ring 23. This decoupling ring is disposed on the hub 10a of the planet gear carrier 10 and is provided on the side thereof facing the planet gears with at least two control tongues 23a. These control tongues engage in recesses 10c of the planet gear carrier which exhibit control surfaces as shown in FIG. 10. The side of the decoupling ring facing toward the brake cone 14' is provided with jaws 23b which engage in grooves or recesses 14a in the brake cone. These jaws serve to keep the decoupling ring 23 in continuous form-locked connection with the brake cone 14 so that the decoupling ring and the brake cone will rotate together.

When the hub body 1 is turned backwards, the control tongues 23a in the recesses 10c will rub against the left frontal face of the planet gear carrier and cause the decoupling ring 23 to axially displace to the position shown in FIG. 11. Because of the action of an annular shoulder 23c of the decoupling ring upon an abutting annular shoulder 8d' of the detent ring, the detent ring 8' will be axially displaced together with the decoupling ring against the action of the annular spring 19'.

The axial displacement of the ring gear 6 is limited by a collar 10d of the planet gear carrier 10. As the detent ring 8' is axially displaced toward the left, therefore, it will become disengaged from the face teeth 6b of the ring gear 6.

The use of the decoupling ring 23 and the detent ring 8' eliminates noise when the hub is free-wheeling and allows the brake to be applied while the hub is turning either forward or backward. The necessity for the decoupling ring 23 becomes particularly important, however, when the gear mechanism moves forward again since the groove 14a' in the brake cone immediately releases the decoupling ring 23 and, in turn, the spring-tensioned detent ring 8', thus again permitting faultfree coupling with the face teeth 6b. If the detent ring 8' were to return along a coarse helix, this would render the decoupling ring 23 superfluous, but would not assure satisfactory coupling engagement with the face teeth 6b of the ring gear 6 because the detent ring 8' would engage too slowly.

In first gear, when the ring gear 6 is axially retracted and the face teeth 6b are no longer coupled with the hub body jaws 1a or with the detent ring jaws 8a', the coupling formed by the cone surfaces 8b' and 14b' is utilized in place of the brake cone face teeth 14b, to permit free-wheeling and to transfer the driving torque to the hub body 1. If, in second or third gear the pedal is moved backwards e.g., during, braking, or if the vehicle is driven backwards and braked, the planet gear carrier 10 will rotate backwards and, with its coarse threaded screw 10b, screw the brake cone 14' toward the brake sleeve 12. It may therefore be seen that the brake can be actuated, even when the vehicle travels in reverse. This type of operation has previously been impossible with any of the conventional multiple-speed gear hubs, particularly those which have three forward speeds.

As noted above, the construction and operation of the gear assembly for shifting into second or third gear is the same as has been described above in connection with FIGS. 1 and 2.

The multiple-speed gear hub according to the present invention is also operable without a back pedal brake. In this case the brake cone can be constructed without the forward expanding or brake applying cone and the brake sleeve 12 can be eliminated. The remaining structure of the multiple-speed gear hub can be left unchanged.

It will be understood that the above description of the present invention is susceptible to various modifications, changes and adaptations.

I claim:

1. In a multiple-speed gear hub suitable for use in wheeled vehicles, said gear hub comprising a drive member for the input of torque, a shifting wheel coupled to said drive member and having externally arranged teeth, and a planet gear mechanism including a sun gear, a plurality of planet gears surrounding said sun gear each arranged on a planet gear shaft and a ring gear surrounding said sun and said planet gears, said ring gear having at least one set of internally arranged teeth which are engageable with the external teeth of said shifting wheel, the improvement wherein said drive member includes extension means having periphery means for providing an axially shiftable mounting of said shifting wheel and for transmitting at the periphery of said extension means the entire torque from said drive member to said shifting wheel, said extension means having at least one axial slot; and wherein said multiple-speed gear hub further comprises follower ring means, arranged in said axial slot of said extension means and coupled to said shifting wheel, for axially shifting said shifting wheel.

2. The improvement defined in claim 1, wherein said shifting wheel has a plurality of axial bores arranged to receive said plurality of planet gear shafts when said shifting wheel is axially shifted toward said planet gear mechanism, said axial bores corresponding in number to the number of said planet gear shafts.

3. The improvement defined in claim 1, wherein said shifting wheel has a plurality of axial bores arranged to receive said plurality of planet gear shafts when said shifting wheel is axially shifted toward said planet gear mechanism, said axial bores corresponding in number to a multiple of the number of said planet gear shafts.

4. The improvement defined in claim 1, wherein said periphery means of said extension means is polygonal in shape.

5. The improvement as claimed in claim 4, wherein said shifting wheel has a plurality of axial bores arranged to receive said plurality of planet gear shafts when said shifting wheel is axially shifted toward said planet gear mechanism, the number of sides of said polygonal shape equalling in number the number of said axial bores, the axial bores situated with respect to angular position in the midpoints of the sides of said polygonal shape.

6. The improvement as claimed in claim 5, the sides of the polygonal shape protruding into said axial bores distances less than the radii of the axial bores, the axial bores protruding beyond said extension means to receive said planet gear shafts when said shifting wheel is axially shifted toward said planet gear mechanism.

7. The improvement defined in claim 1, wherein said multiple-speed gear hub further includes a back-pedal brake.

8. The improvement defined in claim 1, wherein said ring gear has a single set of said internally arranged teeth which is divided into two annular tooth portions of equal diameter by an annular groove extending around the inside periphery of said ring gear, one of said annular tooth portions being arranged to engage with the teeth of said planet gears and the other of said annular tooth portions being arranged to selectively engage with the said external teeth of said shifting wheel.

9. The improvement defined in claim 1, wherein said ring gear is axially movable.

10. In a multiple-speed gear hub suitable for use in wheeled vehicles, said gear hub comprising a drive member for the input of torque, a shifting wheel coupled to said drive member and having externally arranged teeth, and a planet gear mechanism including a sun gear, a plurality of planet gears surrounding said sun gear each arranged on a planet gear shaft and a ring gear surrounding said sun and said planet gears, said ring gear having at least one set of internally arranged teeth which are engageable with the external teeth of said shifting wheel, the improvement wherein said drive member includes extension means providing a sliding surface for said shifting wheel and for rotating said shifting wheel, said extension means having at least one axial slot; wherein said multiple-speed gear hub further comprises follower ring means, arranged in said axial slot of said extension means and coupled to said shifting wheel, for axially shifting said shifting wheel; wherein said shifting wheel has a plurality of axial bores arranged to receive said plurality of planet gear shafts when said shifting wheel is axially shifted toward said planet gear mechanism; wherein said multiple-speed gear hub further includes a hub body surrounding said planet gear mechanism and having a plurality of jaws extending radially inward and includes axially movable brake cone means, having a plurality of sawtooth-shaped face teeth in cooperative relationship with said jaws, for selectively coupling said planet gears with said hub body, and wherein said ring gear is axially movable and has a plurality of sawtooth-shaped face teeth in cooperative relationship with said jaws for selectively coupling said ring gear with said hub body.

11. The improvement defined in claim 10, wherein said multiple-speed gear hub further includes a first detent ring coupled in the axial direction to said ring gear on the face thereof which is provided with face teeth and a second detent ring coupled in the axial direction to said brake cone means on the face thereof which is provided with face teeth, said first detent ring and said second detent ring being also coupled in the circumferential direction to said ring gear and said brake cone means, respectively, so as to permit limited rotational play, therebetween, said first and second detent rings being arranged to slide against said jaws of said hub body when the face teeth of said ring gear and said brake cone means, respectively, are disengaged from said jaws, whereby said first and said second detent rings will then be rotated in the circumferential direction by said jaws in response to a change of speed or direction of rotation of said respective detent ring relative to said jaws.

12. The improvement defined in claim 11, wherein each of said first and said second detent ring is formed with grooves which are spaced around the periphery thereof and are wider in the circumferential direction than said jaws of said hub body, whereby said jaws of said hub body are movable into the spaces between the face teeth of said gear ring and said brake cone means and into said grooves of said first and second detent ring, respectively.

13. The improvement defined in claim 12, wherein said first detent ring and said second detent ring are coupled to said ring gear and said brake cone means, respectively, by at least two projections extending radially inward from each of said ring gear and said brake cone means, said projections being in engagement with cooperating face grooves in said respective first detent ring and second detent ring said face grooves being wider in the circumferential direction than said projections thereby to permit said limited rotational play.

14. The improvement defined in claim 11, wherein said first and second detent ring each has at least two lugs extending radially outward from the periphery thereof which are engageable with said jaws of said hub body; wherein the face teeth of each of said ring gear and said brake cone means include at least two shortened teeth each shortened tooth being arranged to engage one lug of said respective detent ring; and wherein each of said ring gear and said brake cone means has a peripheral land for coupling said respective detent ring in the axial direction, whereby said respective detent ring is coupled in the peripheral direction by the engagement of said lugs between normal ones of said face teeth and said shortened teeth.

15. The improvement defined in claim 10, wherein said brake cone means further includes an internal cone surface and wherein said multiple-speed gear hub further comprises a planet gear carrier; an axially movable detent ring having a ring of external teeth in permanent engagement with said jaws of said hub body and an external cone surface which is engageable with said internal cone surface of said brake cone means; and a decoupling ring arranged on said planet gear carrier between said carrier and said brake cone means, said decoupling ring forming a bearing for said detent ring.

16. The improvement defined in claim 15, wherein said decoupling ring has at least two control tongues on one face side thereof and at least two jaws on the other face side thereof, said control tongues being engageable in cam recesses in said planet gear carrier and said jaws of said decoupling ring being engaged in grooved recesses in said brake cone means.

17. The improvement defined in claim 15, wherein said decoupling ring and said detent ring each has an annular shoulder, said annular shoulders being situated axially opposite each other, thereby to cause said decoupling ring and said detent ring to move together in the axial direction.

18. The improvement defined in claim 15, wherein said multiple-speed gear hub further comprises an axially expandable annular spring arranged between said brake cone means and said detent ring.

19. The improvement defined in claim 10, wherein said multiple-speed gear hub further comprises a first spring means for applying a first biasing force in the axial direction against one side of said follower ring means and a second spring means for applying a second biasing force in the axial direction against the opposite side of said follower ring means, said first biasing force being different from said second biasing force.

20. In a multiple-speed gear hub suitable for use in wheeled vehicles, said gear hub comprising a drive member for the input of torque, a shifting wheel coupled to said drive member and having externally arranged teeth, and a planet gear mechanism including a sun gear, a plurality of planet gears surrounding said sun gear each arranged on a planet gear shaft and a ring gear surrounding said sun and said planet gears, said ring gear having at least one set of internally arranged teeth which are engageable with the external teeth of said shifting wheel, the improvement wherein said drive member includes extension means providing a sliding surface for said shifting wheel and for rotating said shifting wheel, said extension means having at least one axial slot; wherein said multiple-speed gear hub further comprises follower ring means, arranged in said axial slot of said extension means and coupled to said shifting wheel, for axially shifting said shifting wheel; wherein said shifting wheel has a plurality of axial bores arranged to receive said plurality of planet gear shafts when said shifting wheel is axially shifted toward said planet gear mechanism; wherein said multiple-speed gear hub further includes a back-pedal brake; wherein said multiple-speed gear hub further includes a hub body surrounding said planet gear mechanism and having a plurality of jaws extending radially inward; includes axially movable brake cone means, having a plurality of sawtooth-shaped face teeth in cooperative relationship with said jaws, a plurality of face teeth in cooperative relationship with said plurality of planet gear shafts, and a centrally arranged axial bore with an internal coarse thread; and includes a planet gear carrier having a hub portion extending into said axial bore of said brake cone means, said hub portion having an external coarse thread in cooperative relationship with said coarse thread in said bore, said coarse thread in said hub portion and said bore exhibiting sufficient axial play to permit said sawtooth-shaped face teeth of said brake cone means to move axially into and out of engagement with said jaws of said hub body.